Sept. 10, 1929.  W. G. KING  1,727,433
OPHTHALMIC MOUNTING
Filed May 17, 1928

Inventor
WALTER. G. KING
By Harry H. Styll.
Attorney

Patented Sept. 10, 1929.

1,727,433

UNITED STATES PATENT OFFICE.

WALTER G. KING, OF NEW YORK, N. Y., ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed May 17, 1928. Serial No. 278,462.

This invention relates to improvements in ophthalmic mountings and has particular reference to new and improved means of positioning and holding a prescription lens in relation to a protection lens in said mounting.

The principal object of this invention is to provide improved means for holding the prescription lens in the mounting in such a way that it may readily be removed or inserted.

Another object of this invention is to provide a lens holding rim for the prescription lens and means for holding said rim in the mounting, so that the prescription lens will not turn in its rim, or the rim turn in respect to the mounting.

Another object of this invention is to provide means in the mounting to prevent the prescription lens from turning.

A further object of this invention is to provide means for holding the prescription lens in which the dispensing optician can readily insert a prescription lens.

Other objects and advantages of the invention will become apparent from the following description taken in connection with the accompanying drawings, and it will be apparent that many changes may be made in the details of construction and arrangement of parts without departing from the spirit of the invention as expressed in the accompanying claims. I, therefore, do not wish to be limited to the exact details of construction and arrangements shown and described, as the preferred forms only have been shown by way of illustration.

In the accompanying drawings:—

Figure 1:
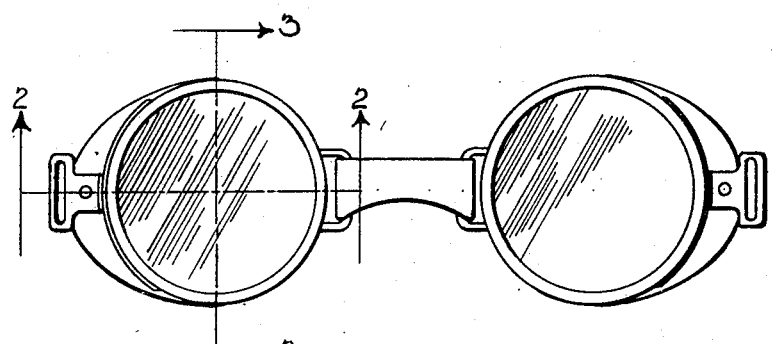
Fig. 1 is a front view of an ophthalmic mounting embodying the invention.

Experience has shown that workmen using protection mountings have, in a number of cases, needed their ocular correction incorporated in the lenses. In cases where a cylindrical lens power is required it is important that the prescription lens be held to axis without turning. Therefore it is the principal object of my invention to provide simple, efficient and inexpensive means for positioning a prescription lens in a mounting having a protection lens as well so that it will be held securely to axis. By a novel and ingenious means I have accomplished this and the prescription lens may be taken out for cleaning and replaced in exactly the same position without mistake.

By reference to the drawings where similar reference characters denote corresponding parts throughout it will be seen that an eye cup 1 of molded fiber or similar material has a screw thread cut on its outer surface. Two shallow slots are cut on the upper face at 4. These slots are to receive the clips 6 soldered or fixed by other suitable means, to the auxiliary rim 12, and are cut slightly shallower than the thickness of said clips. A third slot 5 is cut rather deeper into the eye-cup directly over the temple side for the reception of the end piece 3 of the prescription lens.

A metal cap 9 with a screw thread to fit the eye-cup holds the ferrous iron protection lens 10, which is protected by the crown glass cover lens 11.

In the use of the device the prescription lens 7 is placed inside the auxiliary rim 12 and the screw 13 is tightened to hold the lens securely. The end piece 8 fits into slot 5 of the eye-cup and the position of the lens is now fixed with regard to its axis and prevented from turning in the mounting away from desired axial position.

The ferrous iron lens 10 is placed on the upper surface of the eye-cup, being large enough to sit upon said face and small enough to enter cap 9. The protective crown glass lens 11 of similar size is placed above. By screwing the cap 9 down upon the eye-cup the inner face 14 presses the protection lenses on to the clips 6 of the auxiliary rim 12 and so holds all the loose parts securely.

Figure 2:
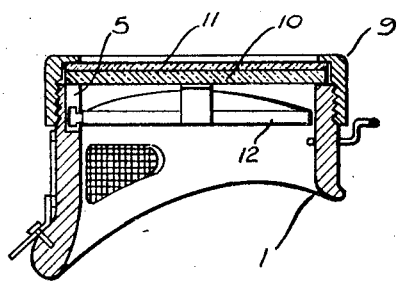
Fig. 2 is a section on line 2—2 of Fig. 1.
Figure 3:
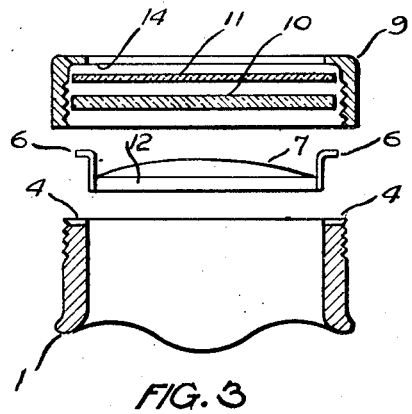
Fig. 3 is a section on line 3—3 of Fig. 1 wherein the parts are shown separated.
Figure 4:
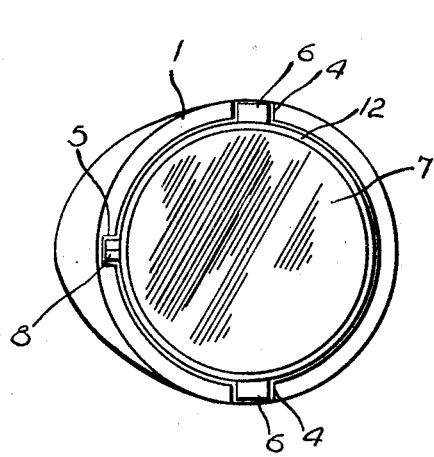
Fig. 4 is a front view of the cup with the cap removed.
Figure 5:
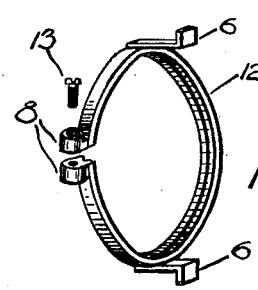
Fig. 5 is a perspective view of the auxiliary rim showing the end piece and screw separated.

By making the slot 5 and the clips 6 of sufficient depth it will be seen by Fig. 2 that a prescription lens of any desired curvature may be used without interfering with the protection lenses mounted above it.

It will be understood that where a cylindrical power prescription lens is used that the eye-cups will be connected by a rigid bridge instead of a flexible one as shown in Fig. 1.

From the foregoing description it will be seen that provision has been made in a simple, inexpensive and efficient manner for carrying out all the objects and uses of the invention, particularly supplying a ready means of holding a prescription lens in correct alignment in a protection goggle or the like to allow for replacement or for removal for cleaning.

Having described my invention, I claim:

1. In a device of the character described, an annular eye cup having a longitudinal recess opening into the eye cup and extending from one end of the eye cup, and another recess in the said end thereof and opening into the interior of the eye cup and an auxiliary lens rim having projecting end pieces and a projecting extension from the periphery thereof, said end piece projections being adapted to fit in the longitudinal recess and said extension being adapted to fit into the end recess to hold said auxiliary rim in the eye cup in spaced relation thereto.

2. In a device of the character described, an annular eye cup having a plurality of recesses in one end thereof opening into the eye cup, an auxiliary lens rim having a plurality of projections from its periphery adapted to fit into the recesses, a lens adapted to fit over the end of the eye cup and hold the projections in place in the recesses and a retaining ring adapted to fit over said lens to hold the same in place over the end of the eye cup.

3. In a device of the character described, an annular eye cup having a threaded portion adjacent one end thereof and a plurality of recesses in said end opening into the interior of the eye cup, an auxiliary lens rim having projecting members from its periphery fitting into the recesses, a lens over the end of the eye cup holding the projections in place in the recesses and a threaded cap ring engaging the threaded portion of the eye cup and holding the lens in place on the end thereof.

4. In a device of the character described, an annular eye cup having a threaded portion adjacent one end thereof and having a plurality of recesses in said end opening into the eye cup, an auxiliary lens rim having projecting end pieces and projecting members from its periphery, said end pieces extending into one recess and said projections into the other recesses, a lens over the end of the eye cup holding the projections in the recesses and a threaded cap member engaging the threaded portion of the eye cup and holding the lens in place on the end thereof.

5. In a device of the character described, an annular eye cup having a threaded portion adjacent one end thereof and having a plurality of recesses across one end thereof opening into the eye cup and having a recess extending from the end longitudinally of the eye cup on the inner side thereof, an auxiliary lens rim having extending end piece members and also extension members with bent-over end clips, said end piece members extending into the longitudinal recess and said clips extending into the cross recesses, a lens over the said end of the eye cup holding the clips in place, and a threaded cap member engaging the threaded portion of the eye cup and holding the lens on the end thereof.

6. In a device of the character described, an eye cup having locating portions adjacent one end, lens holding means having locating portions adapted to be positioned in the eye cup by interengagement of the locating portions, a second lens over the first lens and a cap adapted to secure the second lens to the eye cup.

7. In a device of the character described, an eye cup having locating means adjacent one end, lens holding means having locating portions adapted to be positioned against rotation in the eye cup by interengagement of the locating portions, and means on the eye cup to secure the lens against up and down movement thereon.

8. In a device of the character described, an eye cup having locating means adjacent one end, lens holding means having locating portions adapted to be positioned against rotation in the eye cup by interengagement of the locating portions, a protection lens over the first lens, a second protection lens over the first protection lens and a threaded cap adapted to secure the second protection lens to hold all the lenses against up and down movement.

9. In a device of the character described, an annular eye cup having a plurality of recesses in one end thereof, an auxiliary lens having a plurality of projections from its periphery adapted to fit into the recesses, a second lens adapted to fit over the first lens and hold the first lens in place, and a retaining ring adapted to secure the second lens to the eye cup.

WALTER G. KING.